Nov. 27, 1956  A. N. IKNAYAN ET AL  2,771,936
METHOD OF MAKING A PUNCTURE-SEALING VULCANIZED RUBBER
PNEUMATIC ARTICLE BY INCORPORATING A SEALANT LAYER
OF BUTYL RUBBER PRE-REACTED WITH A CURATIVE
Filed Dec. 2, 1952  2 Sheets-Sheet 1
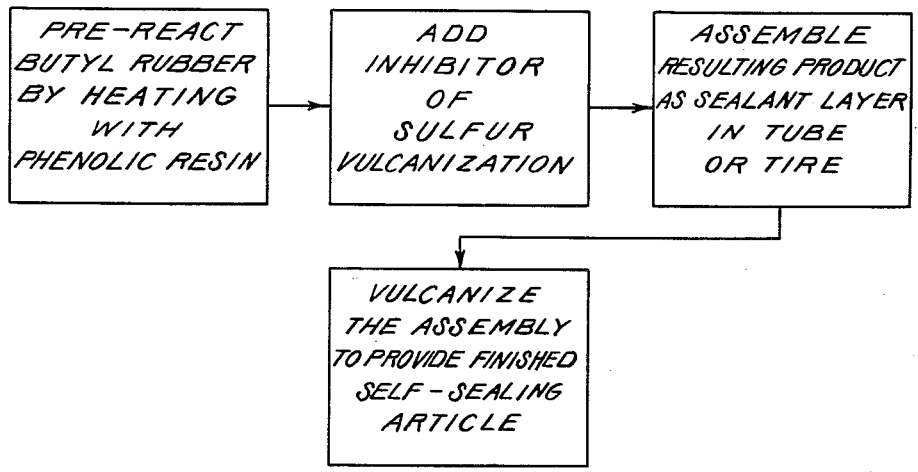
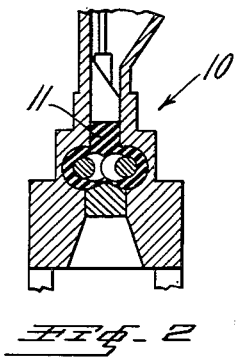
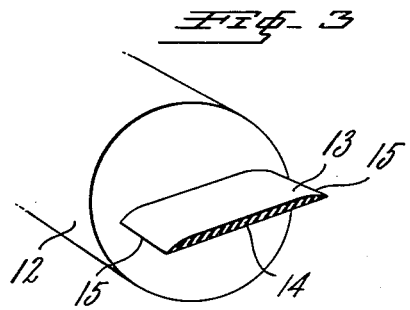
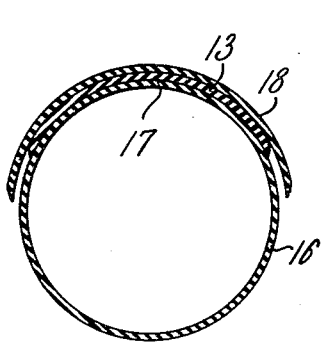
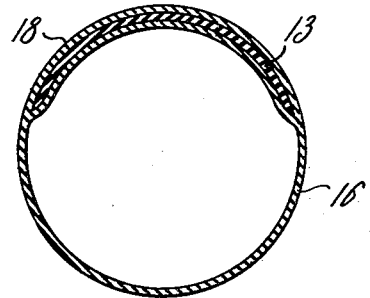
INVENTORS
ALFRED N. IKNAYAN
LESTER C. PETERSON
HARVEY J. BATTS
BY
AGENT Nov. 27, 1956     A. N. IKNAYAN ET AL     2,771,936
METHOD OF MAKING A PUNCTURE-SEALING VULCANIZED RUBBER
PNEUMATIC ARTICLE BY INCORPORATING A SEALANT LAYER
OF BUTYL RUBBER PRE-REACTED WITH A CURATIVE
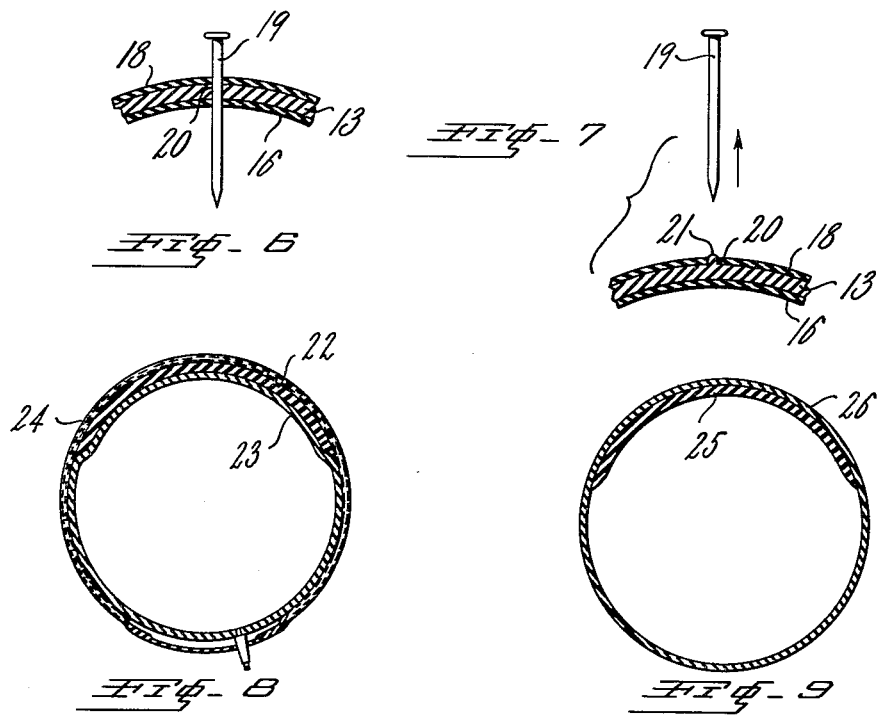
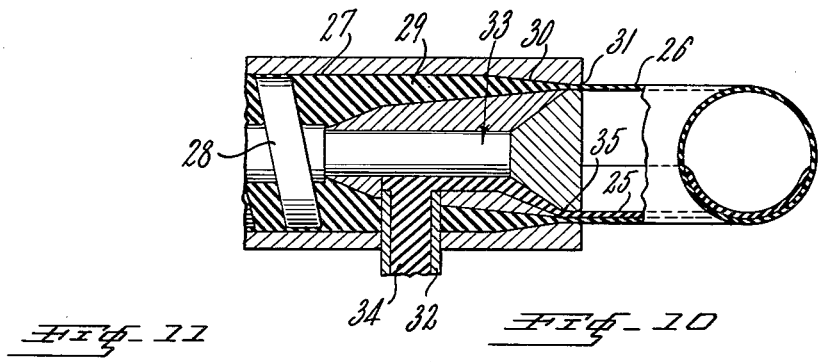
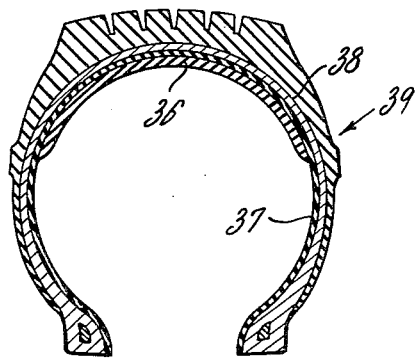
INVENTORS
ALFRED N. IKNAYAN
LESTER C. PETERSON
HARVEY J. BATTS
BY James J. Long
AGENT

United States Patent Office 2,771,936
Patented Nov. 27, 1956

2,771,936

METHOD OF MAKING A PUNCTURE-SEALING VULCANIZED RUBBER PNEUMATIC ARTICLE BY INCORPORATING A SEALANT LAYER OF BUTYL RUBBER PRE-REACTED WITH A CURATIVE

Alfred N. Iknayan, Grosse Pointe Farms, Mich., and Lester C. Peterson and Harvey J. Batts, Indianapolis, Ind., assignors to United States Rubber Company, New York, N. Y., a corporation of New Jersey Application December 2, 1952, Serial No. 323,662

8 Claims. (Cl. 154—15)

This invention relates to an improved method of making a puncture-sealing vulcanized rubber pneumatic article, such as an inner tube or tire casing, containing a layer of plastic puncture-sealing material.

It has been proposed to render a pneumatic tire, or an inner tube, self-sealing, by providing within the tire or inner tube a layer of plastic material, which would serve to seal any punctures made in the tire or tube. However, the methods previously used in manufacturing such puncture-sealing articles have not been entirely satisfactory. Thus, the puncture-sealing tires or tubes made by conventional methods have been subject to gradual hardening of the plastic sealant layer during service, with the result that the sealant layer eventually lost its self-sealing properties.

We have now discovered a new method of preparing a self-sealing tube or tire, that makes it possible to obviate the difficulties of the prior art methods, and which can be carried out conveniently and economically. Various additional advantages and objects of the invention will be made manifest in the following detailed description, which is intended to be read with reference to the accompanying drawings, wherein:

Fig. 1 is a flow diagram, representing the essential steps in a preferred method of carrying out the invention;

Fig. 2 is a diagrammatic sectional elevational view of an internal mixer in which the plastic sealant material employed in the invention is being initially reacted;

Fig. 3 is a diagrammatic perspective view showing the pre-reacted sealant material being extruded in the shape of a desired sealant layer;

Fig. 4 is a cross-sectional view of an inner tube in process of having a sealant layer incorporated therein;

Fig. 5 is a similar view of a completed inner tube made in accordance with the invention;

Figs. 6 and 7 are fragmentary sectional views illustrating how the sealant layer performs the sealing function in the inner tube;

Figs. 8 and 9 are sectional views of modified forms of inner tubes made in accordance with the invention;

Fig. 10 is a diagrammatic sectional view of an extrusion apparatus for preforming the inner tube of Fig. 9; and, Fig. 11 is a cross-sectional view of a pneumatic tire made in accordance with the invention.

The invention is carried out by first modifying Butyl rubber by reacting it with certain chemical agents, which will be more fully disclosed below, with the aid of heat, for a time sufficient to impart to the Butyl rubber the desired combination of plastic and elastic properties that render it ideally suited for use as a puncture-sealant material. Thereafter, the pre-reacted Butyl sealant material is incorporated in an inner tube or pneumatic tire assembly, usually in the unvulcanized state, and the resulting assembly is vulcanized.

Butyl rubber, as is well known, is a commercial synthetic rubber made by copolymerizing an isoolefin, usually isobutylene, with a minor proportion of a multiolefinic unsaturate having from 4 to 14 carbon atoms per molecule. The isoolefins used generally have from 4 to 7 carbon atoms, and such isomonoolefins as isobutylene or ethyl methyl ethylene are preferred. The multiolefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-ethyl butadiene-1,3; and 1,4-dimethyl butadiene-1,3. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

In accordance with the invention, the Butyl rubber, which is to form the sealant layer, is first modified chemically by reacting it with reagents which have a curative effect on the Butyl. The preferred reagents for this purpose are the substances known as dimethylol phenols. Reaction products of Butyl rubber and dimethylol phenols and methods of making the same are disclosed and claimed in our copending application Serial No. 290,344, filed May 27, 1952, now U. S. Patent No. 2,702,287. The dimethylol phenols are known materials. The dimethylol phenol employed may be essentially a monomeric material, or it may be a polymeric material formed by self-condensation of the dimethylol phenol to yield a heat-reactive, oil-soluble, resinous product. Such resinous polymeric dimethylol phenols are the preferred materials for use in manufacturing the puncture-sealant from Butyl rubber in accordance with the method of the invention. Mixtures of the resinous polymeric dimethylol phenols with more or less of low molecular weight or monomeric dimethylol phenols are also useful. For convenience, the term dimethylol phenol will be used to refer to any of the monomeric or polymeric compounds, or to mixtures thereof, unless otherwise stated.

In practicing the invention, the desired chemical and physical modifications of the Butyl rubber are brought about by heating the Butyl rubber in admixture with a small amount of the modifying reagent, which is preferably a dimethylol phenol. However, we can employ in the invention, in place of the dimethylol phenol, other substances which are known to have a curative effect on the Butyl rubber. Examples of such curatives are sulfur, with or without an accelerator of any type; or an ultra-accelerator, either alone or with sulfur; paradinitrosobenzene; metal-dinitrosobenzene; or mixtures of paraquinonedioxime and an oxidizing agent such as red lead. In all cases, whether the curative is a dimethylol phenol or otherwise, the curative is employed in an amount which is only a fraction of that required to completely cure the Butyl rubber. The desired reaction between the Butyl rubber and the curative can be effected by heating, at elevated temperatures, generally in excess of about 200° F., although it is generally preferred to employ a considerably higher temperature, say at least 300° F. While the treating temperature can range upwardly to the point at which the stock would be injured by thermal decomposition, we generally prefer not to exceed a temperature of about 390° F. Temperatures of the order of 400° F. can be applied for limited times, but such high temperatures are likely to injure the Butyl, particularly if maintained for an appreciable length of time. The heating should be continued until the reaction with the dimethylol phenol or other curative is substantially completed. Generally, reaction periods of from about 5 to 45 minutes are sufficient to substantially complete the reaction, depending upon the temperature employed. The lower reaction temperatures of course require the longer reaction times.

The heat treatment of the Butyl rubber with the curative can be carried out under static conditions, for example, by applying extraneous heat to the mixture in an oven. However, we much prefer to effect the heat treatment by masticating the mixture, especially in an internal mixer, or on an open rubber mill, and depend at least in part upon the heat generated by the mixing procedure to raise the temperature of the mixture and thereby accelerate the reaction. If an open rubber mill is used for performing the reaction, we usually heat the rolls so as to cause the temperature of the stock to rise more rapidly to the desired level, while with an internal mixer no extraneous heating is usually required.

As indicated previously, the dimethylol phenol, or other curative, is used in much smaller amounts than would be necessary to fully cure the Butyl. The amount of curative employed for this purpose may vary considerably, but, in all cases, sufficient curative will be employed to produce in the final compounded reaction mix a plasticity within the range of from about 13 to about 30, as measured by the Linhorst method, which will be explained in detail below, or a Mooney viscosity within the range of 40 to 70. The amount of curative most suitable for this purpose will almost invariably be within the range from 0.1 to 2.5 parts per 100 parts of the Butyl rubber. The amount of curative employed to produce optimum results in any given case will vary, depending upon several factors, particularly the relative potency of the curative employed. In the case of the preferred curative, dimethylol phenol, we generally employ from 0.2 to 2.5 parts (per 100 parts of Butyl).

The chemical reaction between the dimethylol phenol or other curatives and the Butyl rubber is accompanied by remarkable changes in the physical properties of the Butyl. The Butyl becomes tougher and more nervy, and increases in tensile strength and modulus as well as in viscosity. It is also observed that during this treatment of the Butyl rubber an appreciable proportion of gel is formed, that is, an appreciable quantity of the Butyl hydrocarbon is converted to a benzol-insoluble form. The plasticity of the reaction mixture provides a good index of the extent to which the reaction has proceeded, since the plasticity will generally decrease gradually as the reaction proceeds to a definite substantially minimum value as the curative becomes essentialy exhausted. The ultimate value of the plasticity will be determined in large part by the amount of curative employed, although the plasticity level attained during the process will also frequently be considerably influenced by the presence or absence of other materials. The plasticity of the mix may be measured by the conventional Mooney or Williams tests. However, it is generally more satisfactory, especially from the standpoint of convenience, to employ the plasticity measurement disclosed in the copending application of E. F. Linhorst, Serial No. 277,779, filed March 21, 1952, now U. S. Patent No. 2,732,708. The Linhorst plasticity measurement is conveniently performed on a sample of the plastic material molded in the form of a small disk or wafer, having, for example, a thickness of 0.09 inch and a diameter of 9/16 inch. The sample is sandwiched between two pieces of emery paper, having a diameter, for example, of 5/8 inch, and suitably being 400 grade paper of the waterproof type, with the abrasive side of the paper in contact with the sample. This assembly is placed between two platens one-half inch in diameter and subjected to a standard loading force, say 8 lbs., for a definite period of time, say 12 minutes, at a controlled elevated temperature. The temperature is conveniently controlled by disposing the sample and platens within a heated glycerol bath, contained in a Dewar flask, during the test. The thickness of the sample, after a definite loading for a definite time and temperature, as determined with the aid of a dial gauge, is an accurate measure of the plasticity of the stock, and is referred to as the Linhorst plasticity.

We also incorporate suitable fillers in the modified Butyl plastic sealing material, preferably at least in part during or before the reaction of the Butyl with the curative. The function of the filler is to reduce the nerve of the composition, since Butyl rubber modified with dimethylol phenol or other curative as described is, per se, quite nervy, and too elastic for use as a sealant, unless it is loaded with appreciable amounts of filler capable of suppressing the elastic properties to a substantial extent. When suitably loaded with an appropriate filler, the modified Butyl becomes more plastic, and provides a balance of elastic and plastic properties that make this material singularly well suited for use as a sealant. The fillers that may be used for this purpose may be any relatively inert, solid, finely powdered material, such as carbon black, clay, mica, calcium carbonate, precipitated hydrated silica, precipitated hydrated calcium silicate, zinc oxide, diatomaceous earth, wood flour or similar fillers known in the rubber compounding art. It is also possible to employ iron oxide, such as black magnetic oxide, as a filler, but this material has been observed to have a definite inhibiting action upon the reaction between Butyl and the dimethylol phenol. Therefore, if this material is used, it should be not be added to the mix until after the reaction has been substantially completed. Usually a total of from 40 to 150 parts by weight of such filler material are employed to 100 parts of the Butyl rubber. Calcined clay is a preferred filler.

The preferred practice is to have at least a part of the filler present in the initial Butyl rubber reaction mix so that the stock can be handled more satisfactorily on the mill. Thus, for example, when the initial reaction mix includes a substantial amount of clay, the mix takes the form of a conveniently handled coherent mass as it comes off the mill, and it can be rolled in "pig" form for easy storage, whereas, in the absence of clay or other filler, the mixture is crumbly and is therefore more difficult to handle and store.

It is also preferred to include in the sealant composition suitable softeners or plasticizers, preferably plasticizers of a somewhat sticky nature, to increase the tack of the mixture. The plasticizer should be of the kind that the skilled rubber compounder refers to as non-migratory, that is, in the final assembly, the plasticizer should have a preference for remaining within the sealant layer with which it is compounded, rather than volatilize or diffuse into the material of the adjacent parts of the inner tube or tire. In this way, the properties of the sealant will be substantially maintained over a prolonged period of service life. Mineral oils, rosin oil, or other known plasticizers may be used. Preferred softeners are liquid tacky resinous materials of high molecular weight, such as polybutene (predominantly high molecular weight monoolefins), or synthetic resins such as the paracoumarone-indene type. Such materials are well known to the skilled rubber compounder. Generally the plasticizer is added subsequently to the reaction between Butyl rubber and the dimethylol phenol. When sufficient plasticizer is used to impart workability to the stock, and to leave it in a softened condition, the mixture will be best suited to perform the sealing functions described in detail below. Usually from about 8 to 50 parts of softener are sufficient for this purpose. In regard to the use of paracoumarone-indene resin as the plasticizer, it should be mentioned that this material may have a definite retarding effect upon the reaction between the butyl rubber and the dimethylol phenol, or sulfur-bearing curative, and, if it is used, it should therefore not be added until after the reaction has been carried out.

The following examples will serve to illustrate the preparation of the plastic sealant material in more detail.

Example 1

The essential steps in the process may be followed by reference to the flow diagram, Fig. 1 of the drawings, wherein the first step shown is to pre-react the Butyl rubber by heating with the curative, in this case a phenolic resin. Referring to Fig. 2, the materials tabulated below were charged to a Banbury mixer 10, and the plastic stock 11 was masticated therein. After seven minutes of mixing, the temperature had reached 300° F., and at the end of 14 minutes the batch was discharged at a temperature of 395° F.

| | Parts by weight |
|---|---|
| Butyl rubber (GR–I 18) | 100.00 |
| Calcined clay (Wytex) | 30.00 |
| Amberol ST–137 resin | .75 |

The Amberol ST-137 is a commercially available resinous dimethylol phenol, believed to be a reaction product of formaldehyde and para-octyl phenol, made in an alkaline medium. It is a solid resinous material. As a result of this treatment the dimethylol phenol was substantially completely reacted. The following table shows the Linhorst and Williams plasticity values, as well as the Mooney viscosity values, obtained at the conclusion of a series of batches processed in accordance with the foregoing procedure.

| Batch | Linhorst Plasticity [1] | Williams Plasticity [2] | Williams Recovery Value | Mooney Viscosity [3] |
|---|---|---|---|---|
| A | 29.6 | 371 | 53 | 91 |
| B | 28.5 | 339 | 41 | 89 |
| C | 21.5 | 327 | 34 | 88 |
| D | 23.0 | 334 | 43 | 92 |
| E | 30.0 | 399 | 122 | 100 |
| F | 30.0 | 406 | 161 | 97 |
| G | 30.5 | 388 | 124 | 98 |
| Average | 27.5 | 366 | 83 | 94 |

[1] Linhorst plasticity determined by the method of application Serial No. 277,779 filed March 21, 1952. The sample was of .075 gauge and was molded for three minutes at 212° F. The viscosity is expressed at a 12 minute reading in ten thousandths of an inch, with an 8 lb. weight at 212° F.
[2] At 212° F.
[3] Large rotor at 212° F.

The following materials were then added to the above intermediate mix in a separate operation.

| | Parts by weight |
|---|---|
| Magnetic iron oxide | 65.00 |
| Cumar P–10 | 10.00 |
| Indopol H–300 | 8.0 |
| Stearic acid | 1.00 |

The Cumar P-10 was a synthetic paracoumarone-indene resin, having a softening range of 45° to 61° F. The Indopol H-300 was a form of polybutene, described as being predominantly high molecular weight monoolefins (85–90%, the balance being isoparaffins). This material had a mean molecular weight of 940 and a Saybolt Universal viscosity at 210° F. of 3330 seconds. The batch was mixed for twelve minutes in a Banbury and discharged at the end of that period at a temperature of 365° F. The resulting mixture was readily processable in the same manner as the usual rubber compounds, and could be extruded readily.

The final mix was appreciably more plastic than the intermediate mix, because of the admixture of softener, as evidenced by the final plasticity and viscosity values of the series of batches:

| Batch | Linhorst Plasticity | Williams Plasticity | Williams Recovery Value | Mooney Viscosity |
|---|---|---|---|---|
| A | 13.5 | 277 | 15 | 42 |
| B | 17.0 | 269 | 13 | 58 |
| C | 17.0 | 269 | 6 | 59 |
| D | 19.5 | 326 | 55 | 69 |
| E | 20.0 | 325 | 56 | 66 |
| F | 20.5 | 329 | 58 | 67 |
| G | 29.5 | 328 | 57 | 70 |
| Average | 18.3 | 303 | 37 | 62 |

As indicated previously, the paracoumarone-indene plasticizer acts as an inhibitor of sulfur vulcanization, and the foregoing mixing step therefor corresponds to the second operation represented in Fig. 1, wherein an inhibitor of sulfur vulcanization is added to the pre-reacted Butyl rubber. The function and advantages of this will be explained in detail below.

The foregoing mixture was then extruded from a conventional extruding device 12, as represented in Fig. 3, to form a strip 13 of sealant material, having a greater thickness at its center 14, than at either of its sides 15, which were gradually tapered. There was then provided, as shown in Fig. 4, an inner tube 16 constructed similarly to an ordinary conventional inner tube, and made of vulcanized rubber. The upper or crown surface 17 of the inner tube was buffed and coated with a suitable adhesive, and a suitable length of the sealant layer 13 was then cemented on to the surface 17 of the tube 16. A sheet of vulcanizable rubber 18, was then cemented over the outer surface of the sealant layer 13 to produce a construction in which the sealant layer is enclosed between the outer crown surface of the inner tube and the applied sheet of rubber, as shown in Fig. 5. This is the third step represented in Fig. 1. Alternatively, the sealant layer 13 may be extruded hot directly onto the cover strip 18, in which case it is not necessary to cement the cover strip to the sealant layer. The entire assembly is thereafter subjected to cure in an inner tube mold, this being the final step represented in Fig. 1.

The action of the sealant layer is such that when the inner tube is accidently pierced by a nail 19 or other object, as indicated in Fig. 6, and the nail is subsequently withdrawn, the sealant is pulled or drawn out through the opening 20 in the form of a small plug or knob 21 (Fig. 7), that effectively seals the opening against loss of air from the inner tube.

A major advantage of the employment of a pre-reacted combination of Butyl rubber and curative such as dimethylol phenol in accordance with the invention is that once the reaction between the Butyl and the dimethylol phenol has been carried out to the extent described, there is substantially no tendency for the physical properties of the reaction product to be altered significantly under the influence of heat subsequently applied to the assembly during vulcanization. Therefore, having provided the Butyl with the desired degree of elasticity and plasticity by pre-reaction, these properties are retained even after vulcanization of the remainder of the assembly and even after indefinite periods of service. In this respect, the invention provides a distinct improvement over the prior art practices of depending upon the ordinary vulcanization cycle to effect partial cure of the Butyl rubber after the sealant layer has already been incorporated in the assembly. Such prior art processes are extremely difficult to control, since the time and temperature requirements of the curing cycle are quite exacting, and these may or may not coincide with the conditions necessary to produce the desired properties in the sealant, so that the prior methods afford little, if any, opportunity to practice the precise control over the critical properties of elasticity and plasticity that is possible with the present invention. In the present invention, the conditions of the pre-reaction can be controlled as carefully as desired, and the Butyl rubber can therefore be modified to the precise extent desired in every instance, with the result that self-sealing articles of uniform high quality can be produced consistently.

A preferred method of practicing the invention, as represented by the foregoing example, involving pre-reacting the Butyl rubber and the curative in an initial reaction mix, followed by incorporation of other materials to make a second mix after the curative has been exhausted, has the important advantage of affording an opportunity to incorporate in the final sealant compound materials which have an inhibiting or retarding action on sulfur vulcanization. The significance of this is that it makes it possible to render the reacted sealant substantially immune to gradual hardening which could otherwise take place as a result of migration or diffusion of residual curatives from the adjoining sulfur-vulcanized portion of the tire or tube. It will be understood that the portions of the tire or tube adjacent to or in contact with the sealant layer will generally be compounded for sulfur vulcanization with conventional accelerators etc. Such stocks ordinarily contain residual materials having curative action that diffuse into adjacent rubber areas and are capable of causing gradual cure, with consequent hardening. Such gradual hardening of the sealant in conventionally made assemblies, with consequent loss of ability to perform the sealing function, has been a major disadvantage of the prior art methods and has in large part been a factor in preventing the development of a fully acceptable self-sealing tube or tire, that would remain satisfactory throughout indefinite periods of service. The paracoumarone-indene resin that was mixed with the pre-reacted Butyl as a plasticizer in the working example given above is an example of such an inhibiting material, since it exerts a pronounced retarding action on the sulfur cure of Butyl. Its presence in the final sealant mixture therefore insures that the sealant will not become undesirably hard as a result of migration of sulfur or other curatives from the tube or tire into the sealant layer. In place of the paracoumarone resin, there could be incorporated in the final sealant mixture small amounts of any other suitable substances known to the skilled rubber compounder as retarders of vulcanization. In general, acidic substances of various kinds are known to be retarders, and may be used for this purpose. Among the known retarders may be mentioned salicylic acid, benzoic acid, zinc chloride, and the like. Numerous retarders are known to the art, and, since they vary considerably with respect to the degree of their retarding action, no definite general statement as to the exact quantity of retarder to be used can be made, having in mind the great variety of retarders available. However, it will be sufficient for purposes of the invention to add enough retarder to the final sealant to substantially inhibit sulfur vulcanization, and the experienced rubber compounder will realize that the quantity of retarder required to do this will not be critical, and he will have no difficulty in selecting a suitable quantity of any given retarder since he is, in general, familiar with its comparative potency. By way of non-limiting example, it may be stated that from about 2 to 5 parts of salicylic acid, per 100 parts of Butyl rubber, exerts a pronounced retarding effect.

The presence of the retarder in the sealant material in accordance with the preferred practice of the invention will also be advantageous during the vulcanization of the tube or tire. Thus, the sealant material is not injured by sulfur, acceleration, or other curatives diffusing out of the adjacent vulcanizable rubber portions of the assembly into the sealant layer, where they would cause it to harden at the vulcanizing temperatures employed.

Reference has been made to the characteristic decrease in the plasticity of the Butyl rubber as a result of the reaction with the curative. This plasticity change may be used as a guide to the sufficiency of the pre-reaction, regardless of the conditions of reaction, or the particular curatives selected. As a general rule, it may be stated that, when compounded as recommended, the sealant body of the invention will preferably have a final Linhorst plasticity of about 18, and will usually fall within the range of from about 13 to about 30. This range represents not only the desirable condition of processability, but also provides the unique and highly effective sealing behavior described above. In terms of Mooney viscosity, the preferred value might be stated to be about 60, while the useful range might be stated to lie between 40 and 70. Since these values represent the plasticity of the final mix, including the softener, it will be understood that when the reaction between the Butyl rubber and the curative is carried out in the absence of substantial plasticizer, as in the preferred procedure of the working example above, the plasticity number will be correspondingly higher, as pointed out in connection with the previous working example. Thus, with no softener present and only a portion of the filler, a suitable range for the Linhorst plasticity of the curative-Butyl reaction product will be from about 20 to 35, or of the order of roughly 85 to 100 in terms of Mooney viscosity.

It will be understood that the reaction product of Butyl rubber and curative used in this invention is still basically uncured or unvulcanized Butyl, that is, it is readily processable like a raw stock and it is still susceptible to sulfur vulcanization. However, for purposes of this invention it is of course not desired to vulcanize the Butyl reaction product further; otherwise the reaction product would lose entirely the unique set of physical properties that makes it admirably adapted to perform the puncture-sealing function described.

When employing, in place of dimethylol phenol, any other curatives, such as those mentioned above, to prepare the modified Butyl, the same general procedure will be followed.

In Fig. 8 we show a modified form of inner tube made in accordance with the invention wherein the sealant layer 22 is contained between an air-impervious envelope 23, and a super-imposed inextensible reinforcing covering 24 that is applied thereover. It will be seen that in an inner tube of this kind, the inner lining 23 takes the place of the tube 16 shown in Figs. 2 and 3, while the reinforcing covering 24 takes the place of the superimposed strip 18. A method of making such a reinforced inner tube is disclosed in U. S. Patent 2,605,200, issued July 29, 1952, to A. N. Iknayan.

In Fig. 9, a sealant layer 25 formulated from pre-reacted Butyl rubber and curative in accordance with the invention is shown adhered to the interior crown surface of a tube 26 without an enclosing member. Such a tube is conveniently manufactured by extruding the usual vulcanizable inner tube stock in tubular form in the conventional manner, while simultaneously extruding the pre-reacted sealant composition on the interior crown surface of the inner tube, in a type of extruding apparatus known as a dual tuber, having provision for concurrent extrusion of different kinds of stock. An extruding device of this kind is illustrated diagrammatically in Fig. 10, which shows a main extrusion chamber 27 provided with the usual extrusion screw 28 for delivering the stock 29 through an extrusion passageway 30 and annular die opening 31 which shapes the stock in the form of a tube 26. An auxiliary extrusion pipe 32 passes into one side of the extrusion head into a core portion 33 in the main extrusion passage, thus providing a passageway for the pre-reacted plastic sealant stock 34 which is forced therethrough by an auxiliary stuffer screw (not shown). The plastic sealant emerges from an opening 35 in the core piece located just before the exit die passage 31 and in so emerging it is laminated firmly to the inner tube stock to form the sealant layer 25 on what will eventually become the crown portion of the inner tube, as shown in Fig. 9. The extruded assembly may be subjected to the usual splicing and shaping operations, and thereafter vulcanized in a conventional inner tube mold. This inner tube, or any of the inner tubes shown previously, may, if desired, be conveyed from the extruder on the type of conveyor adapted to impart an arcuate form to the tube, as shown in the Hinman Patent 2,423,147, issued July 1, 1947.

In Fig. 11, a pre-reacted sealant layer 36 prepared in accordance with the invention as shown adhered to the interior crown surface of a layer 37 of air-impervious stock covering the interior surface of a carcass 38 of a tubeless type of tire 39. The pre-reacted sealant may be assembled with the tire in either the unvulcanized or vulcanized state.

It will be apparent that, in general, the invention provides a tire or tube including an annular air-impervious envelope having, at least over its tread or crown region, a layer of the sealant material that preferably is relatively thickened at its center and gradually tapers off toward each side wall of the assembly. Of course, the sealant may be continued down along each of the sidewalls of the assembly, but this is not generally necessary or desirable.

*Example II*

This example illustrates the practice of the invention with curatives other than dimethylol phenol. The amounts of materials shown in the following table were reacted on a mill for 30 minutes at 325° F.

| Ingredients (parts by weight) | 1 | 2 | 3 | 4 | 5 |
| --- | --- | --- | --- | --- | --- |
| GR-I 18 | 100 | 100 | 100 | 100 | 100 |
| Carbon Black (FEF Code 70) | 30 | 30 | 30 | 30 | 30 |
| Carbon Black (SRF Code 333) | 35 | 35 | 35 | 35 | 35 |
| Mineral Oil (Saybolt Viscosity 160-180 at 100° F.) | 5 | 5 | 5 | 5 | 5 |
| Polyac (paradinitrosobenzene) | .75 | | | | |
| Para-quinonedioxime | | .05 | | | |
| Red Lead | | .20 | | | |
| Tuex (tetramethyl thiuram disulfide) | | | .25 | .05 | |
| Sulfur | | | | .10 | 2.00 |
| Zinc Oxide | | | 3.00 | 3.00 | 3.00 |

After the reaction the mixes had the following plasticities:

|  | 1 | 2 | 3 | 4 | 5 |
| --- | --- | --- | --- | --- | --- |
| Linhorst at 212° F | .0595 | .0523 | .0344 | .0442 | .0613 |
| Williams Plasticity Number at 212° F | 506 | 465 | 381 | 421 | 546 |
| Williams Recovery Value | 159 | 100 | 35.5 | 72.5 | 317 |
| Mooney (Large rotor) | 118 | 100 | 87 | 94 | 127 |

Plasticizer in varying amounts was then added to the foregoing mixes to bring the plasticity to the desired level as follows:

|  | 1 | 2 | 3 | 4 | 5 |
| --- | --- | --- | --- | --- | --- |
| Part of Plasticizer Added (Indopol H-300) | 15 | 12 | 8 | 11 | 24 |
| Linhorst Plasticity | 17 | 17 | 18 | 18 | 17.5 |

The various curatives employed in the invention differ in their potency, and therefore they will, in general, be used in different amounts to arrive at the desired plasticity level. In the case of paradinitrosobenzene we generally use from 0.15 to 0.3 part. The most common commercial form of paradinitrosobenzene is the material known in the trade as "Polyac" which is a mixture of 25% paradinitrosobenzene and 75% of inert carrier, and when this material is used due allowance for the inert carrier must be made. When the curative is a mixture of para-quininonedioxime and red lead, we typically employ from 0.02 to 0.2 part of para-quinonedioxime and from 0.1 to 0.3 part of red lead. In the case of an ultra-accelerator such as tetramethylthiuram disulfide used by itself as a curative, we generally use from 0.1 to 1.0 part. We have obtained good results using a mixture of sulfur and ultra-accelerator disulfide as a curative, using from 0.05 to 0.2 part of sulfur and from 0.02 to 0.2 part of ultra-accelerator in such mixtures. We have also obtained good results with from 1 to 3 parts of sulfur, either alone or with a small amount of an accelerator other than one of the ultra-type.

The oxidizing agent used along with the para-quinonedioxime may be any of those which are commonly used in conjunction with para-quinonedioxime when the latter is used for vulcanizing Butyl rubber. The amount of the oxidizing agent can vary widely depending upon many factors, the most important of which is the particular oxidizing agent employed. Generally the amount of oxidizing agent will be several times greater than the amount of para-quinonedioxime employed. The amount of oxidizing agent should, generally speaking, be sufficient to insure utilization of the bulk of the para-quinonedioxime employed because the latter is considerably more expensive than the oxidizing agent. Red lead is the preferred oxidizing agent and is generally used in amount from 3 to 5 times the amount of para-quinonedioxime. Lead dioxide is another example of a satisfactory oxidizing agent. Ferric oxide, magnetic iron oxide, lead chromate, potassium dichromate, manganese dioxide, zinc dioxide, barium peroxide, mercuric oxide, vanadium pentoxide and other inorganic oxidizing agents are also suitable, as well as organic oxidizing agents as represented by such organic peroxides as benzoyl peroxide. The selection of an oxidizing agent suitable for this purpose is well within the skill of the art. Sometimes the other ingredients of the composition will act as oxidizing agents, in which case no additional oxidizing agent may be necessary. Thus, channel black apparently contains adsorbed oxygen and hence acts as an oxidizing agent. Channel black itself will therefore activate para-quinonedioxime.

The known equivalents of para-quinonedioxime may also be used as curatives in the invention. Thus, para-quinonedioxime esters of aliphatic acids, e. g., p-quinonedioxime diacetate, or of aromatic acids, e. g., the dibenzoate may be employed, with due allowance for the lower curing activity of the esters, because of their higher molecular weight.

The ultra-accelerator used in the invention has been exemplified by a tetraalkylthiuram sulfide, but it will be understood that any of the other accelerators known as ultra-accelerators can be used, either alone or with sulfur. Thus, dithiocarbamate accelerators such as zinc, tellurium or selenium dialkyl dithiocarbamate, dibenzyl dithiocarbamate, or N-pentamethylene dithiocarbamate may be used. The term "sulfur curatives" embraces sulfur or the sulfur-doning materials (ultra-accelerators) used in the invention to modify the butyl rubber.

As indicated previously the preferred curative for use in the invention is a dimethylol phenol, and, of these the most preferred are the polymeric dimethylol phenols. These are well known resinous materials, frequently used in making varnishes and the like. They are generally solids and are therefore more convenient to handle than the monomeric dimethylol phenols, which are frequently liquids in the crude form, and tend to be malodorous and lachrymatory. The resinous dimethylol phenols are also more effective in producing the desired physical properties in the butyl.

As will be understood by those skilled in the art, the dimethylol phenols are typically made by reacting a para-substituted phenol having the two ortho positions unoccupied, with a considerable molar excess of formaldehyde, the molar ratio of formaldehyde to phenol typically being 2:1, in the presence of a strong alkaline catalyst, especially an alkali metal hydroxide, which is subsequently neutralized. Typically the mixture of the phenol, formaldehyde and alkaline catalyst is heated at a suitable temperature, e. g., 25–100° C., the first stage of the reaction involving formation of the phenol methylol, i. e., the para-substituted-2,6-dimethylol phenol. This material, which is a phenol dialcohol, can be isolated by acidification of the mixture and separation of the oily layer which can then be advanced to higher molecular weight form by heating at say 75–175° C. This higher molecular weight form is oil-soluble and heat-reactive, and has the advantages that is more reactive with the Butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case care should be taken to stop while the resin is in the soluble (in conventional organic solvents and drying oils) and fusible state. This is the resol type of resin.

The phenol from which the dimethylol phenol is made generally has a hydrocarbon group in the position para to the phenolic hydroxyl, examples being alkyl groups, especially alkyl groups having from 3 to 20 carbon atoms, tertiary-butyl and tertiary-octyl (alpha, alpha, gamma, gamma-tetramethyl butyl) being especially preferred, cycloalkyl groups, aryl groups such as phenyl, and aralkyl groups such as benzyl and cumyl. We believe that the tertiary-butyl and the aforementioned branched octyl are outstanding. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-octyl phenol
2,6-dimethylol-4-dodecyl phenol
2,6-dimethylol-4-phenyl phenol
2,6-dimethylol-4-benzyl phenol
2,6-dimethylol-4-(alpha, alpha-dimethyl benzyl) phenol
2,6-dimethylol-4-cyclohexyl phenol As indicated previously, the amount of dimethylolphenol employed is generally from 0.2 to 2.5 parts per 100 parts of Butyl rubber. It may happen that the Butyl rubber will contain certain materials, incorporated therein by the manufacturer, that appear to have a definite retarding action on the reaction between the Butyl and the dimethylol phenol. Certain amines used as stabilizing antioxidants, especially phenyl beta-naphthylamine, metallic soaps such as zinc stearate, and free fatty acids such as stearic acid are believed to exert a retarding action, and such retarding action is most pronounced when the amount of dimethylol phenol is relatively small, say from 0.2 to 1 part. Therefore, when such retarders are present in substantial amounts we prefer to employ amounts of dimethylol phenol within the upper part of the recommended range and in this way we have found it possible to compensate for such retarding effect.

Having thus described our invention, what we claim and desire to protect by Letters Patent is:

1. In a method of making a puncture-sealing pneumatic article comprising an annular air-impervious rubber envelope having incorporated in at least its crown portion a layer of plastic sealant material which is a reaction product of (1) a synthetic rubbery copolymer of an isoolefin having from 4 to 7 carbon atoms with from 0.5 to 10% of an aliphatic conjugated diolefin having from 4 to 6 carbon atoms and (2) a curative for said rubbery copolymer in amount of from 0.1 to 2.5 parts by weight, per 100 parts of said rubbery copolymer, said reaction product being made by heating the said reactants (1) and (2) in intimate admixture at a temperature of from 200° to 400° F. for from 5 to 45 minutes, the improvement which comprises the step of carrying out said heating of said reactants prior to incorporating the said sealant layer in the said air-impervious rubber envelope and prior to the vulcanization of the assembly, and then vulcanizing the assembly.

2. A method of making a puncture-sealing pneumatic article comprising in combination the steps of providing an annular air-impervious rubber envelope having a crown portion and side wall portions, separately pre-reacting a plastic sealant material by heating at a temperature of from 200° to 400° F. for from 5 to 45 minutes an intimate mixture of (1) a synthetic rubbery copolymer of isobutylene with from 0.5 to 5% of isoprene and (2) a curative for said rubbery copolymer in amount of from 0.1 to 2.5 parts by weight, thereafter incorporating the thus pre-reacted sealant as a sealant layer in at least the crown portion of the said air-impervious rubber envelope, and then vulcanizing the assembly.

3. A method of making a puncture-sealing pneumatic article comprising in combination the steps of providing an annular air-impervious envelope of rubber having a crown portion and side wall portions and containing sulfur curatives which are capable of migrating into any adjacent rubber layers and causing cure of such layers at temperatures existing within said pneumatic article in use, separately pre-reacting a plastic sealant material to a definite desired state of cure in which the plastic has sealing properties by heating at a temperature of from 200° to 400° F. for from 5 to 45 minutes an intimate mixture of (1) a synthetic rubbery copolymer of an isoolefin having from 4 to 7 carbon atoms with from 0.5 to 10% of an aliphatic conjugated diolefin having from 4 to 6 carbon atoms and (2) a curative for said rubbery copolymer in amount of from 0.1 to 2.5 parts by weight, per 100 parts of said rubbery copolymer, incorporating a retarder of sulfur vulcanization in said sealant material in amount sufficient to prevent the aforesaid migrating sulfur curatives from causing continued cure of said sealant with resulting hardening and loss of desired sealing properties, and thereafter incorporating the said pre-reacted sealant containing said retarder as a sealant layer in at least the crown portion of the said air-impervious rubber envelope, and then vulcanizing the assembly.

4. A method as in claim 3 in which the said curative used in the said pre-reaction of the sealant plastic is a sulfur curative.

5. A method as in claim 3 in which the said curative used in the said pre-reaction of the sealant plastic is paradinitrosobenzene.

6. A method as in claim 3 in which the said curative used in the said pre-reaction of the sealant plastic is paraquinone dioxime.

7. In a method of making a puncture-sealing pneumatic article comprising an annular air-impervious rubber envelope having a crown portion and side wall portions and containing sulfur curatives which are capable of migrating into any adjacent rubber layers and causing cure of such layers at temperatures existing within said pneumatic article in use, said rubber envelope having incorporated at least in its crown portion a layer of plastic sealant material which is a reaction product of (1) a synthetic rubbery copolymer of an isoolefin having from 4 to 7 carbon atoms with from 0.5 to 10% of an aliphatic conjugated diolefin having from 4 to 6 carbon atoms and (2) a 2,6-dimethylol-4-hydrocarbon phenol in amount of from 0.2 to 2.5 parts by weight, per 100 parts of said rubbery copolymer, said reaction product being made by heating the said reactants (1) and (2) in intimate admixture at a temperature of from 200° to 400° F. or from 5 to 45 minutes, the improvement which comprises the steps of carrying out the said heating prior to incorporating the said reaction product as a sealant layer in the said air-impervious rubber envelope, and incorporating a retarder of sulfur vulcanization in said sealant material in amount sufficient to prevent the aforesaid migrating sulfur curatives from causing continued cure of said sealant with resulting hardening and loss of desired sealing properties, said steps of said improvement being carried out prior to the vulcanization of the assembly, and then vulcanizing the assembly.

8. A method of making a puncture-sealing pneumatic article comprising in combination the steps of providing an annular air-impervious envelope of rubber having a crown portion and side wall portions, and containing sulfur curatives which are capable of migrating into any adjacent rubber layers and causing cure of such layers at temperatures existing within said pneumatic article in use, separately pre-reacting a plastic sealing material to a definite desired state of cure in which the plastic has sealing properties by heating at a temperature of from 200° to 400° F. for from 5 to 45 minutes an intimate admixture of (1) a synthetic rubbery copolymer of isobutylene with from 0.5 to 5% of isoprene and (2) a resinous 2,6-dimethylol-4-lower alkyl phenol in amount of from 0.2 to 2.5 parts by weight, per 100 parts of the said rubbery copolymer, incorporating a retarder of sulfur vulcanization in said sealant material in amount sufficient to prevent the aforesaid migrating sulfur curatives from causing continued cure of said sealant with resulting hardening and loss of desired sealing properties, thereafter incorporating the said pre-reacted sealant containing said retarder as a sealant layer in at least the crown portion of said air-impervious rubber envelope, and then vulcanizing the assembly.

References Cited in the file of this patent
UNITED STATES PATENTS

| | | | |
|---|---|---|---|
| 2,283,183 | Carnahan | May 19, | 1942 |
| 2,441,945 | Frolich | May 25, | 1948 |
| 2,524,977 | Holbrook | Oct. 10, | 1950 |
| 2,566,384 | Tilton | Sept. 4, | 1951 |
| 2,633,177 | Waber | Mar. 31, | 1953 |
| 2,687,976 | Gerke | Aug. 31, | 1954 |
| 2,687,977 | Gerke | Aug. 31, | 1954 |